US006697817B2

United States Patent
Muraoka

(10) Patent No.: US 6,697,817 B2
(45) Date of Patent: Feb. 24, 2004

(54) VARIABLE-LENGTH DATABASE APPARATUS AND METHOD FOR ACCESSING THE SAME

(75) Inventor: Yoshihito Muraoka, Hokkaido (JP)

(73) Assignees: Datt Japan, Inc. (JP); Alfa Teccs Co., Ltd. (JP)

( * ) Notice: Subject to any disclaimer, the term of this patent is extended or adjusted under 35 U.S.C. 154(b) by 137 days.

(21) Appl. No.: 09/950,564

(22) Filed: Sep. 10, 2001

(65) Prior Publication Data

US 2002/0087539 A1 Jul. 4, 2002

(30) Foreign Application Priority Data

Sep. 11, 2000 (JP) ........................................ 2000-274416

(51) Int. Cl.[7] .............................................. G06F 17/30
(52) U.S. Cl. ..................... 707/102; 707/100; 707/104.1
(58) Field of Search ............................... 707/3, 6, 8, 10, 707/102, 104.1; 709/229, 230, 216, 232, 238; 370/392, 401, 428

(56) References Cited

U.S. PATENT DOCUMENTS 5,964,835 A * 10/1999 Fowler et al. ............... 709/216
5,974,416 A * 10/1999 Anand et al. ................. 707/10

\* cited by examiner

Primary Examiner—Charles Rones
Assistant Examiner—Neveen Abel-Jalil
(74) Attorney, Agent, or Firm—Townsend and Townsend and Crew LLP

(57) ABSTRACT

A variable-length database apparatus capable of performing addition, change or the like of data without reconstructing a database in the event of attempting to change the database in accordance with the items of a table or the change of specifications of a record. The database apparatus is provided with an inputting portion for inputting stored data. It also has a retrieval condition, a database for storing data inputted by the inputting portion, a database management system for reading and writing data from and to the database, and an outputting portion for outputting the result of retrieving data stored in the database. The database includes: (1) an item definition area for storing, and relating to each other, the item name, data type and item length of each item defined in said database, and the packet number given to the item of data; (2) a record management area for giving a packet number to a record consisting of items defined by the item definition, and for storing and relating to each other those packet numbers; (3) a data area for storing items of data; (4) an extracting means for extracting, when data inputted by said inputting portion and data in the record management area are matched with a retrieval condition in retrieval of data, the matched data from said data area; and (5) an outputting means for outputting the data extracted by the extracting means.

22 Claims, 12 Drawing Sheets

| Data type | Data length | Contents of data |

VARIABLE-LENGTH DATABASE APPARATUS AND METHOD FOR ACCESSING THE SAME

BACKGROUND OF THE INVENTION

1. Field of the Invention

The present invention relates generally to a database system for handling multimedia data such as image data, voice data, movie data and the like, and more particularly to a variable-length database storing method and apparatus which can perform addition, change and deletion of data during operation of the database system, and which do not need to reconstruct the composition of the database.

2. Prior Art

A database stores various kinds of data made to correspond to other data, and retrieves and outputs desired data at need. A conventional database consists of a database having data stored in it, a database managing system for reading and writing data from and into the database, a server or other suitable computer system for operating and managing the database, and applications realizing various functions using the database on the server/computer system.

At present relational databases are in common use. The relational database makes every data relate to other data using a table, and forms and stores those relations into a table. Data typically is stored in a specified length, in a specified type, in a specified area and in specified order. In a conventional database structure, the length of a record or an item of managed data typically is fixed. Therefore, if the compatibility of data is not kept, an error may occur, causing the database or a program accessing the database to abort. When a database definition or structure is modified, it causes the data in the database to be incompatible with the database. Thus, the data needs to be modified, so that it is compatible with the database. This can be very time consuming.

As one skilled in the art will appreciate, multimedia files are managed as binary large object (BLOB) types, or managed by means of a method of storing the data as an external file and making them correspond to their file name. Therefore, the database has no consistency, has been complicated in management, and is poor in system efficiency.

With rapid advance of information technology (IT), various social activities or economic activities utilizing IT have become more and more common. Further, with the development of data processing apparatuses and communication technologies, various types of data have come into use. In such an environment, the importance of establishing a method for efficiently handling an enormous amount of data is becoming a higher priority.

Since many databases are customized for specific operations or services, a large amount of work is required to perform this customization.

A table in a database is managed in a state where data having a fixed record length or a fixed item data length are put close in a regular order. In order to access a desired record, it is necessary to calculate the address of a record stored, determine the location of the record and access the record. Accordingly, it is necessary that the structure of the data be fixed.

Due to such a structure, when registration of an item is changed, if all relevant records are not changed, the compatibility of data is lost and a database table becomes inaccessible. In order to reconstruct a database to maintain the compatibility of data, it has been necessary to interrupt the use of the database system.

As a result, it has become necessary to handle data that varies significantly in length such as multimedia data. On setting the length of data, the maximum possible length of data in ordinarily used applications is set and defined. A table can quickly become redundant, the efficiency of utilizing resources becomes poor, and management of the database becomes laborsome. Therefore, an object-oriented database is also conceived in order to handle multimedia data, but is different in structure from commonly used databases. Accordingly, it has been difficult to incorporate such a database into a conventional database.

Furthermore, with the spread of the Internet, there has been increased use of languages such as XML (Extensible Markup Language) or the like, which has excellent compatibility with the Internet. A conventional database cannot cope with a flexible item definition and a structured data structure by means of XML. It needs to redefine a table or a structure each time the definition of XML is performed. Each time, it is necessary to stop and reconstruct a database system.

The present invention has been performed in consideration of such circumstances, and in one embodiment of the present invention there is provided a database apparatus and a database accessing method for managing very long data having variable-length records and variable-length items by means of a single table.

Further, in another embodiment of the present invention there is provided a database apparatus capable of performing additions or changes of data without reconstructing a database when attempting to modify the database with the modification of items of a table or specifications of a record.

SUMMARY OF THE INVENTION

In order to solve the previously mentioned problems of a conventional database structure, the present invention makes it possible to handle items and record data of variable length. There is provided in accordance with the present invention, a database apparatus for storing variable-length data items. The apparatus includes an inputting portion for receiving a data item to be written into the database and for receiving a retrieval condition when a data item is to be read from the database, an outputting portion for outputting data items read from the database, a database management system for controlling the writing and reading of the data items, and a data store. Each data item is stored in the form of one or more data packets.

The data store has an item definition area, a record management area, and a data area. The item definition area stores, in connection with each data item, a data item name, data item type (e.g., category such as text or image), and data item length. The item definition area also stores a packet address (number) assigned to each data item. The record definition area manages records and assigns a packet address to each record, the record comprising a plurality of data items related to each other and defined by said item definition area. The data area stores the actual data items.

The database management system retrieves a data item from the data store when a retrieval condition inputted at the inputting portion matches data in the item definition area and the record management area, resulting in the retrieved data item being provided to the outputting portion.

In another embodiment, there is provided a variable-length database apparatus with an inputting portion for inputting stored data and a retrieval condition, a database for storing data inputted by said inputting portion in it, a database management system for reading and writing data from and to said database, and an outputting portion for outputting the result of retrieving data stored in said database, comprising:

a means for generating an item definition area for relating to each other and storing in it the item name, data type, and item length of each item data defined in said database, and the packet number given to said item;

a means for generating a record management area for giving a packet number to a record consisting of items defined by said item definition, and relating to each other and storing them in it;

a means for generating a data area by referring to other data inputted by said inputting portion and said record management area;

an extracting means for extracting, when data inputted by said inputting portion and data in said record management area are matched with a retrieval condition in retrieval of data, the matched data from said data area; and an outputting means for outputting the data extracted by said extracting means.

Hereupon, said database is comprised of said item definition area formed out of variable-length data, said record management area and said data area. Said data typically has a length and type optionally set for each data.

The database apparatus has a means for forming each of said item definition area, said record management area, and said data area out of independent packets managed by a node descriptor and a node allocation table. Said database has a means provided with a node allocation table for managing the address of said packet. Said database also has a means for managing the basic information, location, and size of a record. It is provided with a means for storing data extracted and outputted by a process of extracting said data from said data area and a means for outputting the extracted data, and further a means for displaying said extracted and outputted data.

Each of the data tables of said item definition area, said record management area and said data area is composed of a plurality of packets and clusters, and said data table is accessed in packets.

The first packet of the first cluster of said data table typically is a table control packet. The forefront packet of the second or following cluster is a packet control table showing a use state of a packet.

The size of said packet is an integral multiple of 256 bytes. The number of packets contained in said cluster is 8n when the size of a packet is n bytes. The size of said cluster is $8n^2$ bytes when the size of a packet is n bytes.

In an event where the data size of a record is larger than the size of a packet, a means for dividing and storing the record into plural packets is provided. A means for indirectly referring to the relevant packet in addressing said divided and stored data is provided. Said indirect addressing process is performed by a means for referring to the relevant packet by means of a packet address managed by a node allocation table specified by said node descriptor.

A means for managing a process of indirectly addressing a record of up to $n^2/8$ bytes when one packet is of n bytes in said addressing is provided. A means capable of managing a one-stage or more-stage indirect addressing process in the event that the size of a record is not smaller than the size of said packet in said addressing is provided. A means in which said packets are independent and not restricted by the continuity or the location of each packet stored on a file is provided.

Further, the present invention comprises a variable-length database accessing method for inputting stored data and a retrieval condition for storing inputted data, and outputting the result of retrieved data stored in said database, comprising:

a process of generating an item definition area for relating to other definition areas and storing the item name, data type, and item length of each item defined in said database, and the packet number given to said item;

a process of generating said record management area for giving a packet number to a record composed of items defined by said item definition and for relating to other item definitions, and storing them; and a process of generating a data area by referring to other data inputted by said inputting portion and said record management area.

Said method further comprises;

a process of extracting, when data inputted by said inputting portion and data in said record management area are matched with a retrieval condition in retrieval of data, the matched data from said data area; and a process of outputting said extracted data.

This method has a process of forming said item definition areas, said record management areas, and said data areas out of a data table composed of independent packets managed by the node descriptor and the node allocation table.

Said data typically has a length and type optionally set for each data. Said database has a process of being provided with the node allocation table for managing the address of said packet and the node descriptor for managing the basic information, location, and size of a record. A process of forming said item definition areas, said record management areas, and said data areas out of a data table composed of independent packets managed by the node descriptor and the node allocation table is provided. A data table is composed of a plurality of packets and clusters, wherein said data table is accessed in packets. The first packet of the first cluster of said data table is a table control packet. The forefront packet of the second or following cluster is a packet control table showing a use state of a packet.

In an event where the data size of a record is larger than the size of a packet, the record is divided and stored into plural packets. A process of indirectly referring to a packet when addressing said divided and stored data is provided. Said indirect addressing process is performed by referring to the relevant packet by means of said packet address managed by a node allocation table specified by said node descriptor.

A means for managing a process of indirectly addressing a record of up to $n^2/8$ bytes when one packet is of n bytes in said addressing is provided. In the event that the size of a record is not smaller than the size of said packet in said addressing, a one-stage or more-stage indirect addressing process may be managed.

Said packets are typically independent and therefore not restricted by the continuity or the location of each packet stored in a file. Consequently, it is possible to add or change an item.

Further, said database may automatically determine and register the type of multimedia data utilizing the Internet at said database.

A variable registered item and variable-length database system of the present invention makes it possible to handle an item definition structure, a record structure, and a data record as variable-length data by managing the whole file as an aggregate of packets.

When addition, change, deletion or the like of an item or record occurs, inputting the relevant data each time is usually sufficient. The inputted data are processed in packets, and are related and stored without being restricted by the length or location of the data. Since a database system of the present invention may store inputted data consecutively, it may cope with processing huge data using the Internet which will be utilized more frequently.

The present invention is typically used to change the structure of a database or efficiently manage very long multimedia data as keeping the system operated. A variable-length database of the present invention is capable of coping with a new flexible data structure of XML or the like having a flexible data structure so as to adapt to a system capability required for a future information environment.

BRIEF DESCRIPTION OF THE DRAWINGS

FIG. 4 (consisting of FIGS. 4(a), 4(b) and 4(c)) explains the addressing states of a node descriptor and a node allocation table according to an embodiment of the present invention, wherein

DETAILED DESCRIPTION OF THE PREFERRED EMBODIMENTS

A database apparatus and a method according to various embodiments of the present invention are now described with reference to the drawings.

Figure 1:
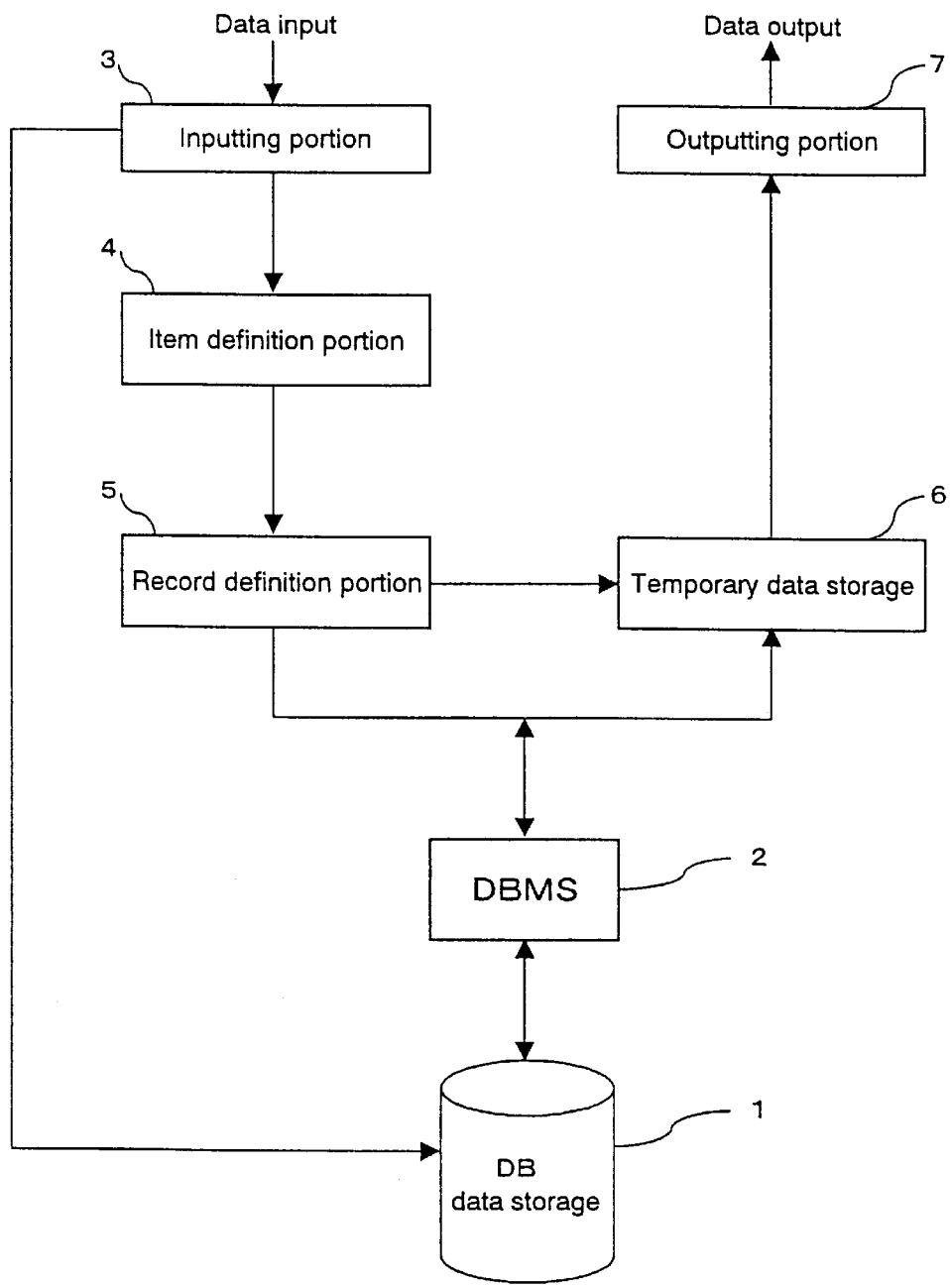
FIG. 1 shows a block diagram of a structure example of a variable-length database apparatus according to an embodiment of the present invention.

FIG. 1 is a block diagram showing the basic functional components of an apparatus in accordance with one embodiment of the invention. The data base apparatus includes a database (DB) storage system 1, a database management system 2 (hereinafter, referred to as "DBMS") for inputting and outputting (writing and reading) data to and from the data storage 1, a data inputting portion 3 for receiving data to be stored or used by the apparatus, an item definition portion 4 for defining the items of data, and a record definition portion 5 for defining a record and relating items to the record. A temporary data storage portion 6 temporarily stores data taken out from the database. An outputting portion outputs stored data.

Before describing the overall operation of the apparatus of FIG. 1, it is useful to first provide background information concerning relational databases and the manner of storing data therein.

Relational databases can be viewed (in a simplified form), as a table storing data in rows and columns. The horizontal rows are "records", and each vertical column consists of "items". Thus each record consists of a plurality of "items", and the items in each record are related (for example, in an data base of employee information, the "record" of each employee can consist of a plurality of related items, such as employee ID number, employee name, employee address, employee status, etc.). In order to access any piece of data, the database system must use and store identifying definitional information for the both the "record" and each "item".

Returning to FIG. 1, in order to use the database and access an item of data, it is thus necessary to not only store each piece of actual data, but also store the definition or characteristics of the item (e.g., item name, data type and length) as well as location characteristics of the record containing that item (i.e., the number or address of the data packets containing the items of that record). Thus, when data is to be stored, the database must first be defined (through definitional information received at inputting portion 3) at the item definition portion 4, which then holds for each data item to be stored the various characteristics of that item (e.g., item name, data type and length). As actual item data is received (at inputting portion 3) and written into data storage 1, the item definition portion 4 determines the location where the item is stored and that location is stored (along with other identifying characteristics for that stored item) in the item definition portion 4.

As each table of records is created, the record definition portion 5 stores (in the form of a packet) the identification of each item included in the records of that table.

When data is to be read from data storage 1, a data identifier is provided to the record definition portion 5, and if it matches identifying data in the record definition portion 5 (indicating the that the requested item data is in the data storage system 1), that data is read and provided to the outputting portion 7 via the temporary data storage 6. The reading, writing and addressing of data is all done under the control of the DBMS 2.

As will be described shortly, one aspect of the present invention is that data (whether it be actual data, item definition data or record definition data) is stored in the database system as data packets (or "clusters" of data packets). Further, and as will be described in more detail below in conjunction with FIG. 3(b), there is provided for each piece of stored data (whether it be actual data, item definition data or record definition data) a node descriptor which, among other things, provides a "real" packet address for that data in order to permit data to be accessed as variable-length data items.

Figure 2:
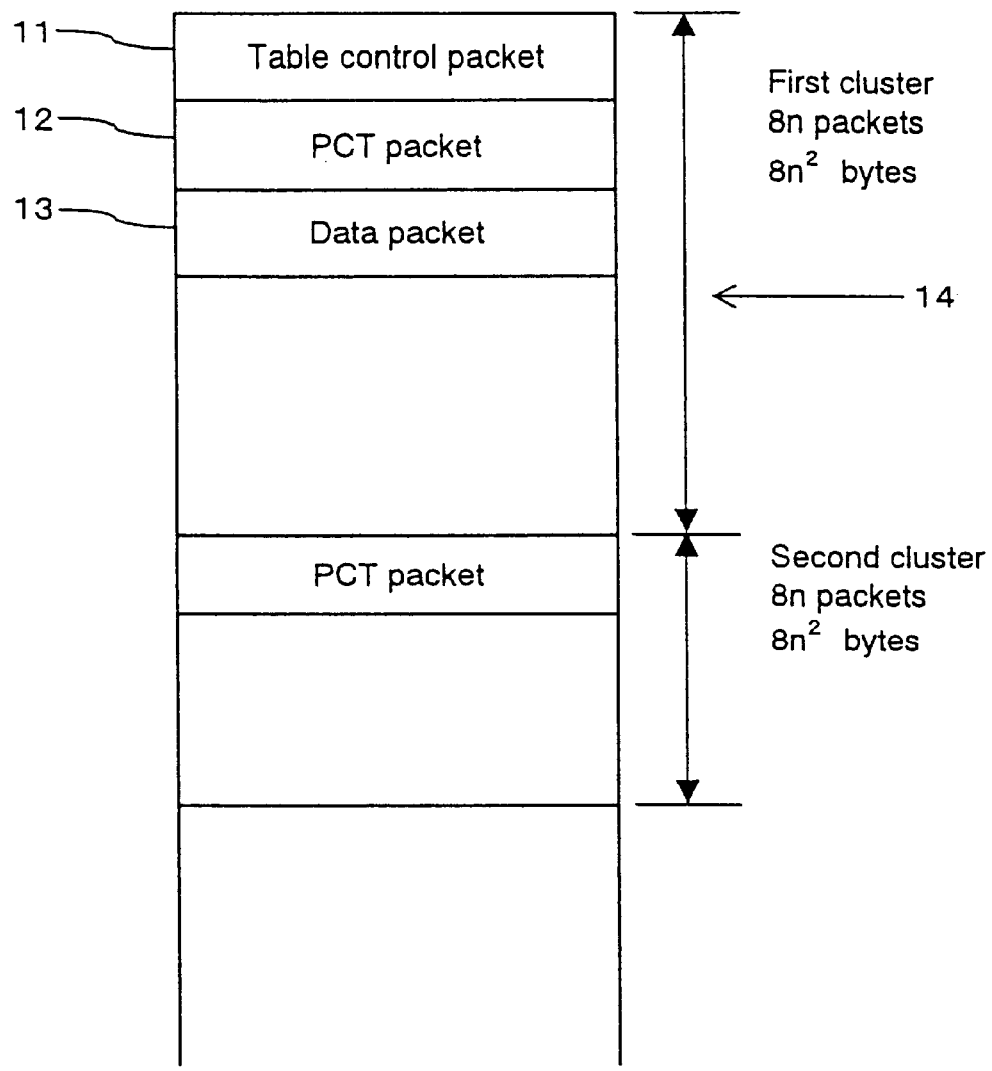
FIG. 2 shows a basic structure example of a database table according to an embodiment of the present invention.

Next, the structure of a variable-length database using said apparatus is described. FIG. 2 shows a basic structure of a variable database table of the present invention.

A variable-length database (Variable Storage Data Base or "VSDB") of the present invention manages the whole database table as an aggregate of packets. A VSDB file accesses a variable-length record by linking packets in the same manner as a conventional file system. This makes it possible to handle each item definition structure, record structure, and data record as variable-length data.

A table is composed of clusters and packets, and is accessed as packets. A cluster is an access unit for convenience in managing packets. Clusters may be arranged one after another as data to be stored increases.

A database of the present invention is capable of realizing a variable-length record by linking fixed-length packets. So long as data may be put in one packet, the data is stored in the same packet. Data which may not be put in one packet is divided and stored into plural packets, and managed by a node allocation table. A node descriptor indicates a node allocation table, and a group of these manages each node (first packet of a plurality of packets).

A packet is a basic unit to be handled by a table, and corresponds to a sector in a general file system. A cluster is a unit to be used for managing a packet group composed of a certain number of packets. At the front position of a cluster there is a packet control table (PCT) 12 for showing a use state of each of the packets registered at said cluster. The first packet 11 of the first cluster 14 is called a table control packet 11 or simply a table header, and has basic information of a table stored in it. The 64 bytes at the front position of the packet 11 is a header determined at the time a file is created and is not changed. The 192 bytes following these form a control area managed by a VSDB system. A second or following cluster does not have such an exceptional packet (the table control packet), but does have a PCT packet 12 and successive data packets 13.

The size of a packet is an integral multiple of 256 bytes, and the number of packets capable of belonging to one cluster is 8n (where the size of a packet is n bytes). The size of a cluster is $8n^2$ bytes (where the size of a packet is n bytes).

Figure 3A:
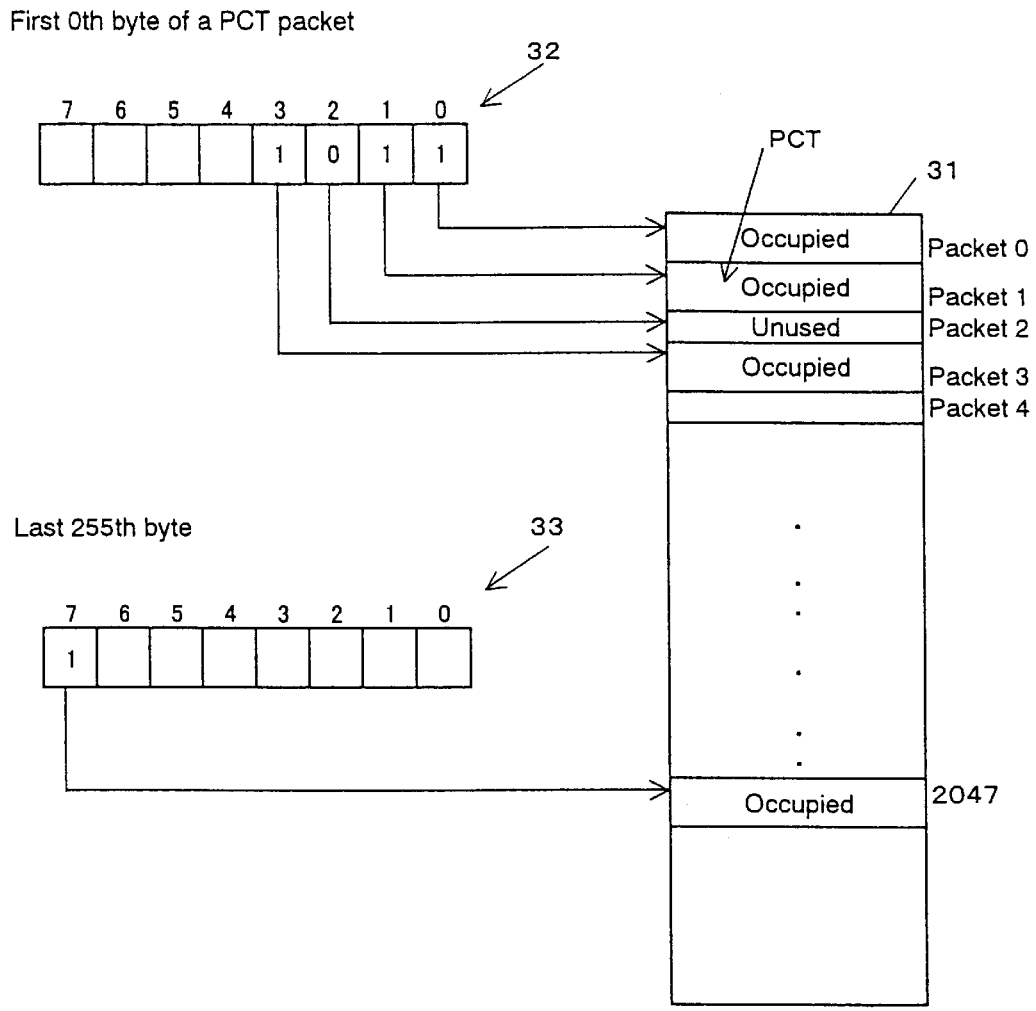
FIGS. 3(a) and 3(b) respectively show a use state of a packet control table (PCT) and a structure example of a node descriptor, according to an embodiment of the present invention.

The structure of a PCT packet is described with reference to FIG. 3(a). One byte of data is 8 bits. Typically, the size of a PCT packet 31 is 256 bytes (identified as 0th though 255th). In the 0th byte 32 of a PCT packet, bit 0 represents packet 0 and bit 1 represents packet 1. Bit 0 of the 1st byte represents packet 8. The last packet 2047 of a cluster is typically represented by bit 7 of the 255th byte 33.

There are three kinds of packets: a PCT packet showing a use state of a cluster, a data packet representing actual data, and a node allocation table packet having positional information of a record recorded in it.

A table is typically accessed by means of a variable-length record having an unfixed length. In a table, a packet is used as the minimum unit for accessing, but plural packets are managed as a bundle in order to manage large data or variable-length data. A node descriptor and a node allocation table manage this bundle of packets. The typical information, location, size, and the like of a record are managed by the node descriptor.

Figure 3B:
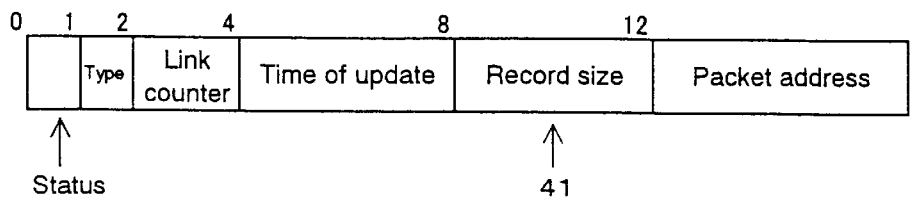

FIG. 3(b) shows the structure of a node descriptor.

The node descriptor 41 is in the table control packet 11. The node descriptor is composed of data of 16 bytes (0th through 15th bytes) representing the status, type, link counter, record size, packet address and the like of a record.

The status (0th byte) is information of 1 byte and represents a use state of the record, an accessing state of the record, or the like. The 0th to 2nd bits represent the number of stages of indirect addressing, the 3rd and 4th bits represent an access permission, the 5th bit represents a link flag, and the 6th and 7th bits represent the state of the record.

The state of a record represented by the 6th and 7th bits of status information includes information of unused, trashed, occupied, and discarded states. And a link flag of 1 in the 5th bit represents that the record is a virtual record.

In the event of a virtual record, the structure of a record descriptor is different from this. The type of a record represents the use purpose of the record.

The access permission information of the 3rd and 4th bits of the status information is 2-bit information. The two-bit information of 00 means access prohibited, 01 means user's reading permitted, 10 means user's writing permitted, and 11 means user's reading and writing permitted.

The 0th, 1st, and 2nd bits of the status information represent the number of indirect address stages of 0 to 4. When the number of address stages is 0, the node descriptor indicates directly recorded data. When it is 1, a packet indicated by the record descriptor represents a node allocation table, and a link of the node allocation table to real data is realized.

The type (1st byte of the record descriptor) is 1 byte in size and is data showing the use purpose of the record.

The link counter (2nd and 3rd bytes of the record descriptor) represents the number of virtual records referring to this record. The link counter is incremented when a virtual record is linked, and is decremented when a virtual record is unlinked.

The update time (4th through 7th bytes of the record descriptor) preserves the year, month, day, hour, minute, and second when a record was last updated.

The record size (8th through 11th bytes of the record descriptor) represents the length of a real record in bytes.

The packet address (12th through 15th bytes of the record descriptor) represents a packet address indicating a record data packet or a root record address table packet. The size of an address is 20 bits when it represents a cluster address, 11 bits when it represents a packet address.

A virtual record descriptor does not have the type, link counter, update time and record size differently from an ordinary record descriptor. A field originally having a packet address contained in it, has the record address of a record to be linked placed in it.

Figure 4A:
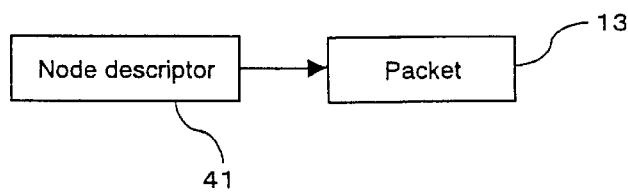
FIG. 4(a) shows a state of directly addressing a packet.

FIG. 4 is an example showing an addressing state of a packet performed by a node descriptor. The node descriptor is data of 16 bytes representing the size, location, type, and the like of a record. Data registered at a record are placed and preserved in packets. Therefore, in the event where the length of a record is smaller than the size of a packet, the node descriptor directly indicates the packet having data in the node placed in it. FIG. 4(a) shows this state. In the event that data of a record is larger than the size of a packet, the node descriptor indirectly indicates the packet.

Figure 4B:
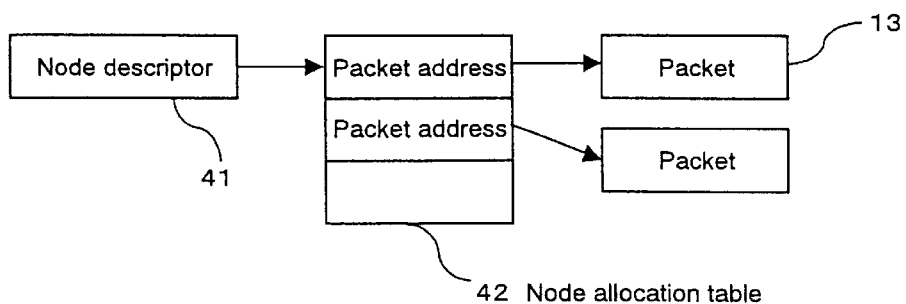
FIG. 4(b) shows a one-stage indirect addressing state.

FIG. 4(b) shows this state. In this embodiment, the node descriptor 41 indicates a node allocation table 42 and refers to a packet by means of a packet address managed by the node allocation table. This method is called an indirect addressing method. It is possible to manage a record of up to $n^2/8$ bytes, when one packet is of n bytes, by means of the one-stage indirect addressing method.

In the event that data may not be completely put in one packet as shown in FIG. 4(b), the data are registered over two or more packets. An aggregate of packet address packets providing the addresses of packets at which data are registered is called a node allocation table.

Figure 4C:
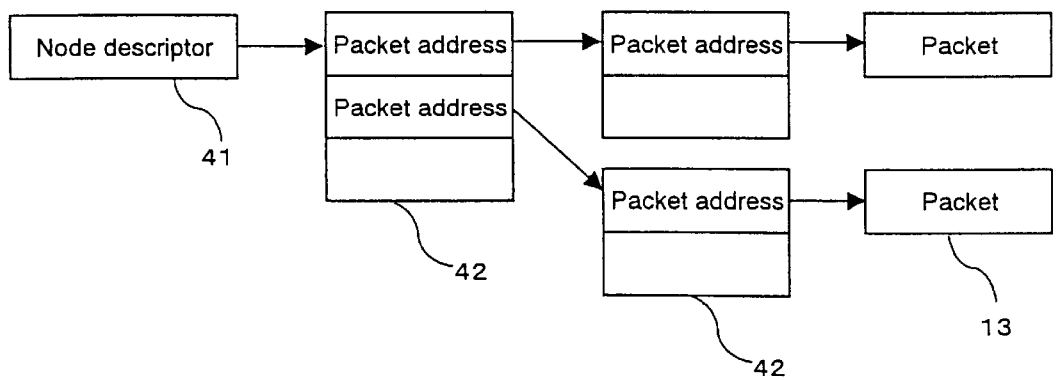
FIG. 4(c) shows a two-stage indirect addressing state.

Data having a further larger size may be managed by an indirect addressing method having two or more stages. FIG. 4(c) is an example of a 2-stage indirect addressing. The size of data capable of being managed by an indirect addressing method, when one packet is of n bytes, is $n^3/64$ bytes when using 2-stage addressing, $n^4/512$ bytes when using 3-stage addressing, and $n^5/4096$ bytes when using 4-stage addressing. When representing this with a calculating expression, in the event that the size of a packet equals n bytes, the size of data capable of being managed by m-stage addressing equals $n^{(m+1)}/8^m$ bytes. In the event that the number of packets required does not fill the capacity of the node allocation table, the unoccupied part of the table is filled with nulls.

Figure 5:
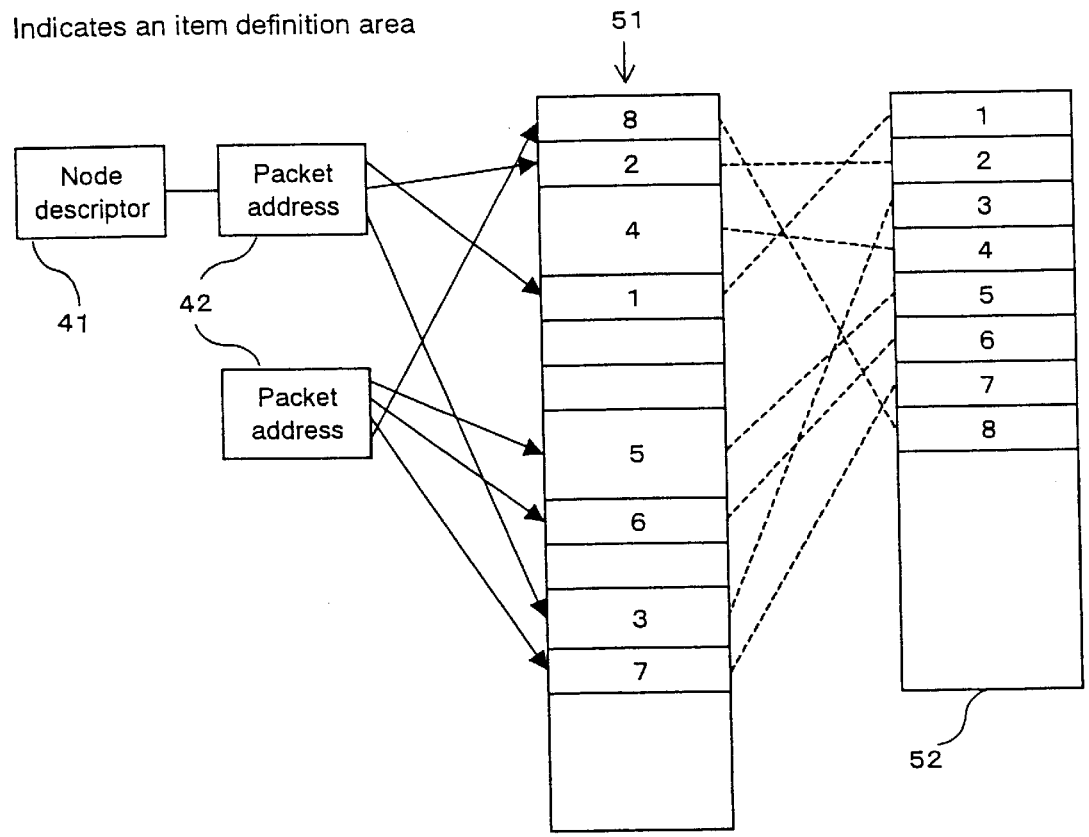
FIG. 5 shows an item definition area example according to an embodiment of the present invention.

FIG. 5 is a diagram for explaining an accessing state of an item definition area. For simplification of the description, an embodiment where a 2-stage node allocation table is provided is shown as an example.

An item definition area is stored in packets managed by a node descriptor and a node allocation table. Each packet is independent and does not depend on the continuity or location of an actual file 51. As shown in FIG. 5, packets are stored in the order of packet 8, packet 2 and packet 4 and are not consecutive. However, they may be handled as a consecutive data structure in a virtual file image 52.

As shown in FIG. 5, item definition information is an aggregate of in consecutive packets stored in an actual file area. As a virtual image, it is in a state where in consecutive packets are connected together to come into a consecutive state. A change in the size of an item definition area caused by addition or deletion of a packet does not cause modification of the whole file. In the event of addition, adding an unused packet as a packet for an item definition area is usually sufficient. In the event of deletion, the relevant packet is deleted and modification to the whole file usually does not occur. Therefore, it is not necessary to reconstruct the database.

Figures 6, 7:
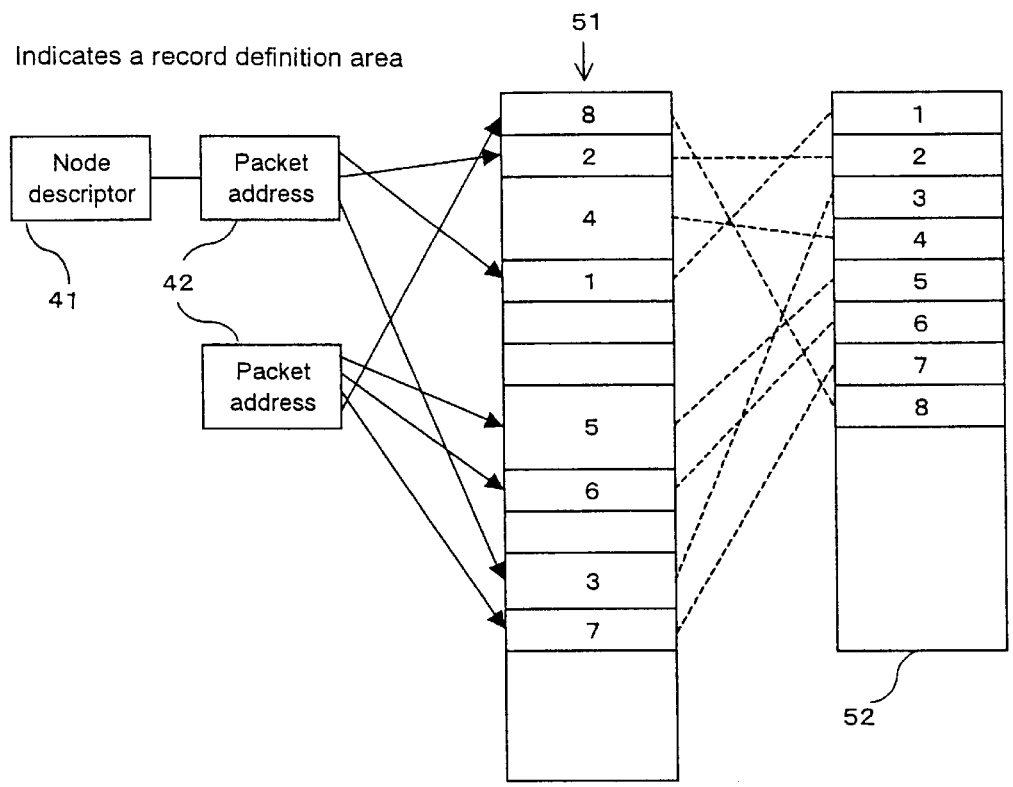
FIG. 6 shows a record definition area example according to an embodiment of the present invention.
FIG. 7 shows a structure example of a data record according to an embodiment of the present invention.

FIG. 6 show an accessing state of a record management (record definition) area.

A record management area stores record definition packets managed by a node descriptor and a node allocation table. Each packet is independent and does not need the continuity or location on a file to be specified. A record definition area of FIG. 6 is stored in a state where packets having a certain number of node descriptors in consecutively stored in them through the node allocation table are linked to one another consecutively ascending from packet 1. As a virtual image, it is in a state where inconsecutive packets are linked with one another to come into a consecutive state. A data area of each node is accessed by means of the node descriptor stored in the packet.

FIG. 7 show a structure example of a data area.

A data area is stored in packets managed by a node descriptor and a node allocation table. Each packet is independent and does not depend on the continuity or location of a file. A method for accessing a data area is typically capable of recording data by virtually linking inconsecutive packets together. As a virtual image, it is in a state where inconsecutive packets are linked with one another to come into a consecutive state. Since packets do not need to be consecutively stored, packets already stored do not need to be relocated. Therefore, change in the size of an item definition area caused by addition or deletion of a packet usually does not cause modification to the whole file.

In the event of adding a packet, adding an unused packet as a packet for an item definition area is usually sufficient. In the event of deletion, the relevant packet is deleted and it is usually not necessary to reconstruct the database.

Generally, the inside of a record of a variable-length structure is composed of one or more variable-length items (fields). An item is composed of an item header having the type or size (length) of the item described in it and an item body being different according to each item. Data defined by an item definition area are stored in a data record shown as an example in FIG. 7. Data are composed of the data type, data size, and data. The data type represents the type of data, which is different according to the type of a record, but the formats of the beginning of data (BOD) and the end of record (EOR) are determined in a system. The data length represents the length of an item body.

The format of an item body is indefinite since it is determined by the type of a record. Typically, being restricted by item definition and the like, the type or length of data may be optionally set for each data, and data being different in length or type may be registered. In the event of registering very long data, the data are registered over several packets but operation to modify the whole table usually does not occur.

Figure 8:
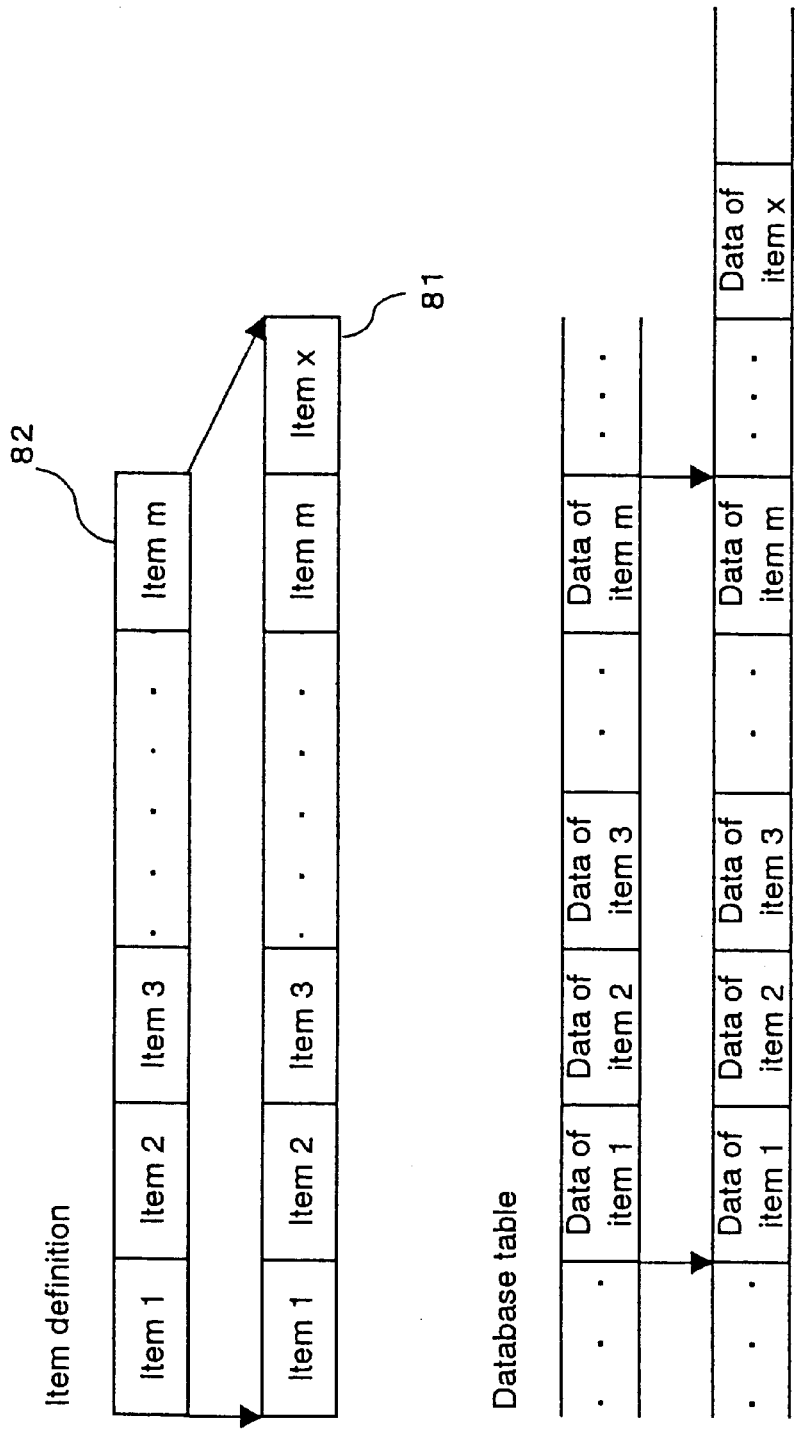
FIG. 8 shows an example of addition of an item according to an embodiment of the present invention.

Next, operation of adding a new item to a database table is described with reference to FIG. 8. An image where data are inconsecutively stored in packets is omitted and an image where data are consecutively stored is described.

Operation for adding a new item x 81 to an existing item definition is described. Since the arrangement and the order of items are not associated with each other, item x is added after item m 82. In the event that a space for item x is left in a packet, data of item x is written into the packet, but in the event that item x overflows from the packet, it is written into a newly added packet. Since an area of data is generated in packets when the data is registered or updated, addition of an item does not require the whole database table to be updated.

Figure 9:
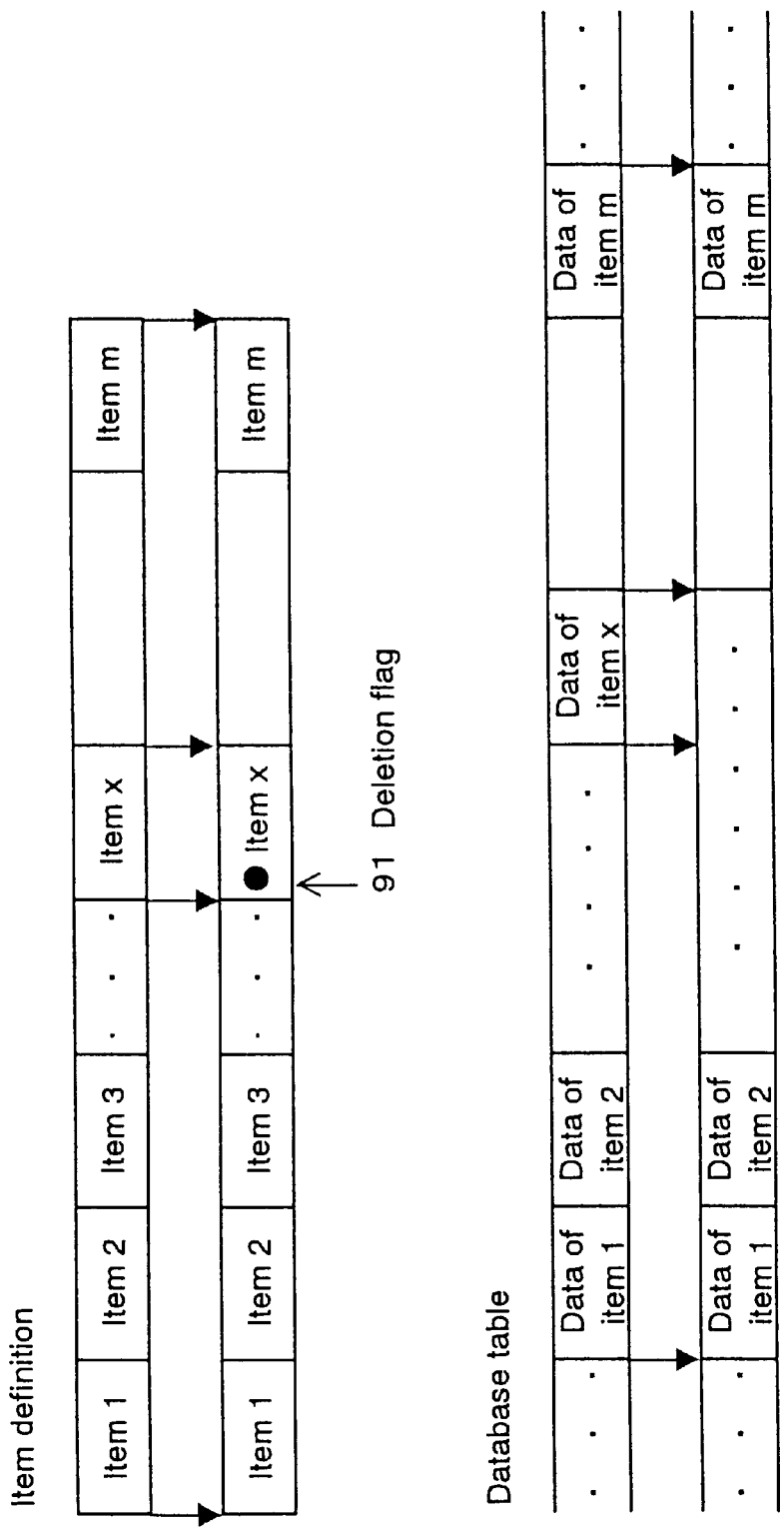
FIG. 9 shows an example of deletion of an item according to an embodiment of the present invention.

A deletion work is described with reference to FIG. 9. Item x being an existing item is deleted from an item definition area. Actually, item x in the definition area is not deleted but a deletion flag 91 is set on item x. The area of data is not immediately deleted; instead, it is deleted when the data is updated. Therefore, even when an item is deleted, a database table does not need to be extensively updated. Since a deletion flag is set on an item until it is actually deleted, the data is controlled against access.

Figure 10:
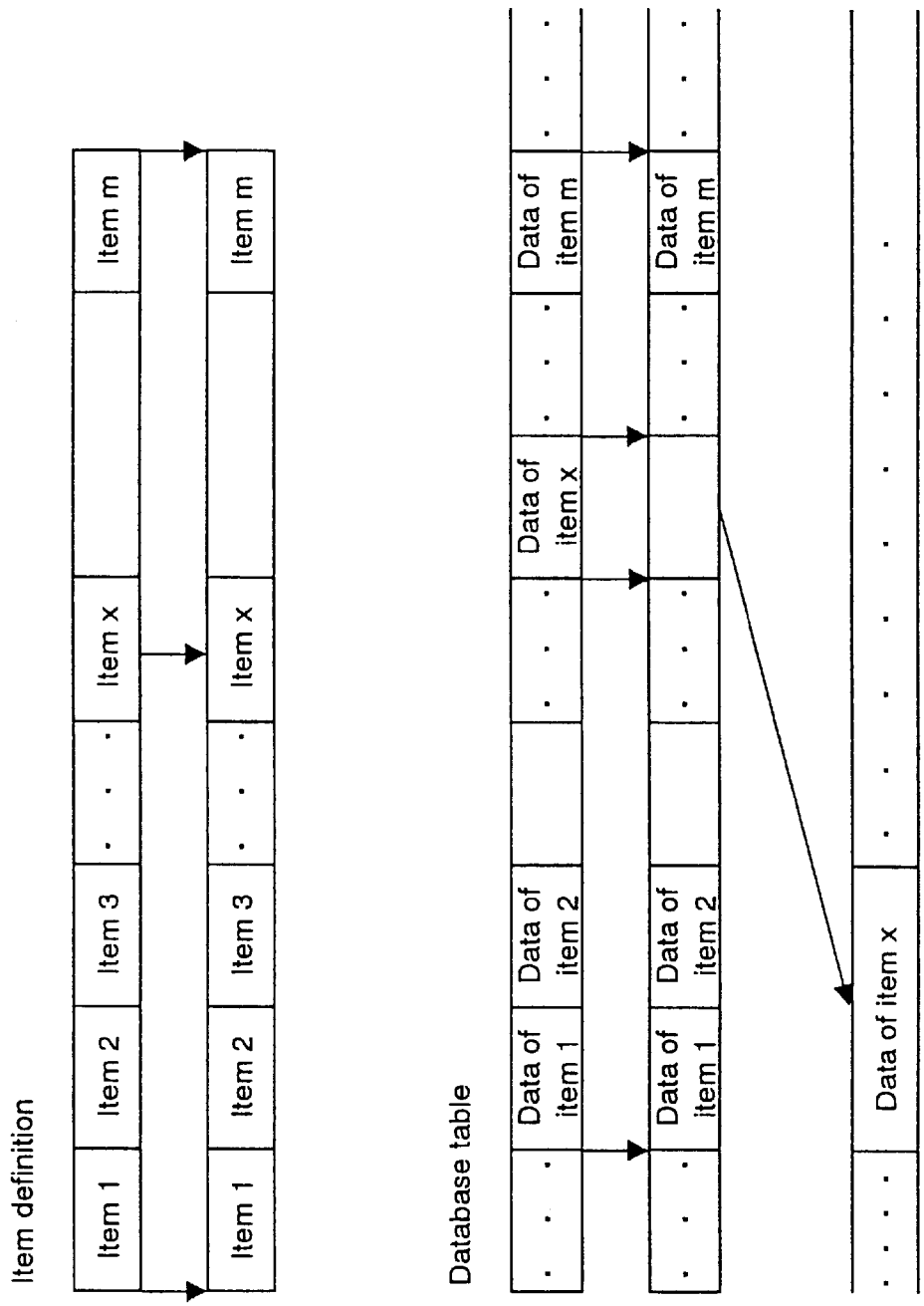
FIG. 10 shows an example of change of an item according to an embodiment of the present invention.

Change of an item length is described with reference to FIG. 10. This is the operation of changing the length of item x being an existing item in an item definition area. If the item definition is changed and the data is not changed, the item itself is not changed. Therefore, the item is not updated until the data is registered at the data area of the database. In the event that data overflows from a packet, the data is registered in another packet. A vacant data area occupied by the item x registered in another packet may be used by other data. Therefore, even when an item is changed, the database table does not need to be extensively updated.

Figure 11:
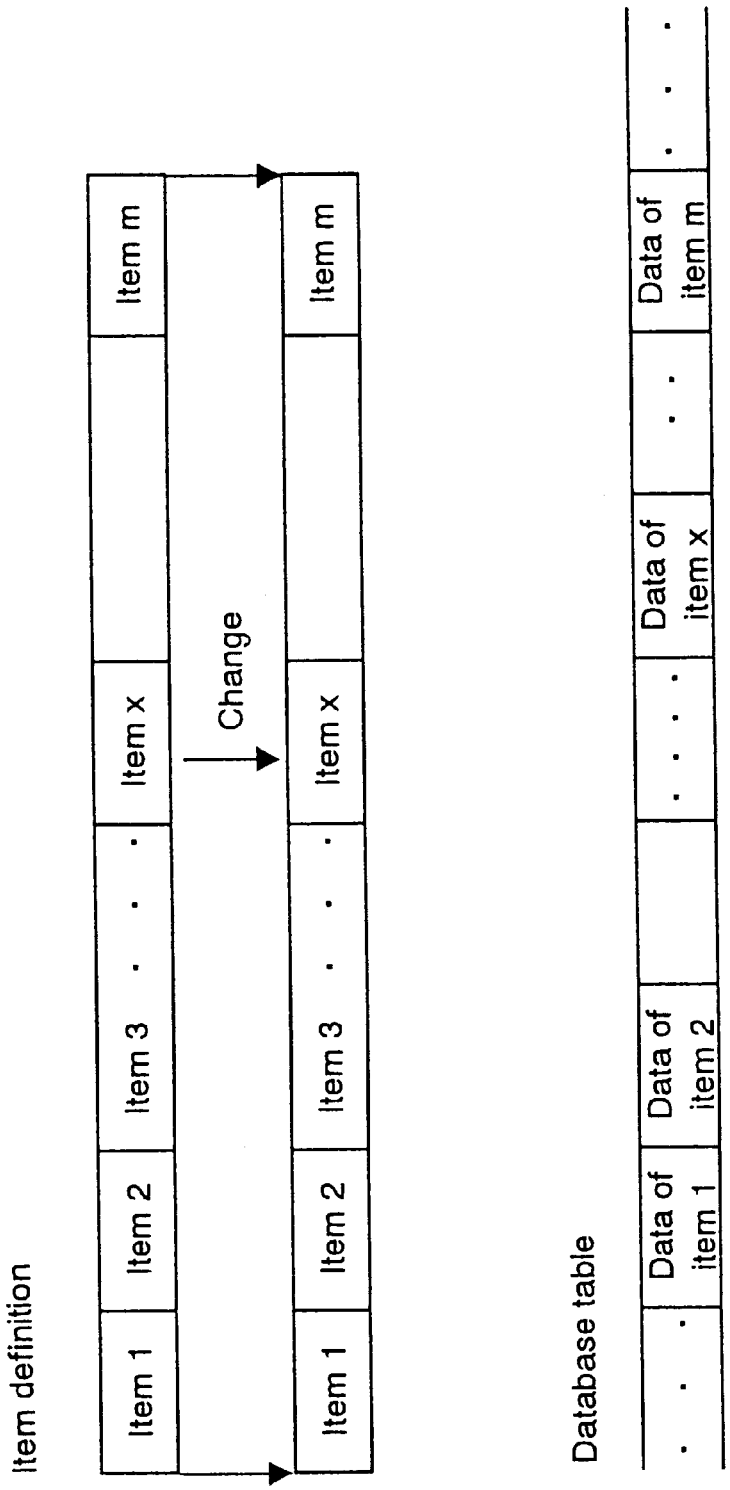
FIG. 11 shows an example of change of the type of an item according to an embodiment of the present invention.

The operation of changing the type of item data is described with reference to FIG. 11. If an item definition is changed, the type of data is stored in the item data, and therefore even if the type of an item definition is changed, the data does not need to be changed. Accordingly, if the definition of a type defined in item x is changed, the data does not need to be changed. In fact, the type of an item defined in an item definition simply defines the type of the item at the time of input and output, but does not define the type of real data. Therefore, when an item type is changed, the database table does not need to be extensively updated.

Although the basic structure of the present invention has been described, the functions provided by a VSDB system for operating a system of the present invention are described. The following are typical database functions performed by one embodiment of the VSDB system.

First, to initialize and to end the VSDB system are mentioned as functions related to the VSDB system.

As functions related to a VSDB file, to open and create a file, close a file, temporarily close a file, reopen a file, and set the number of records registered at a file, cancel a password, and set a password are mentioned.

As functions related to a record, to open and create a record, open a management record, close a record, delete a record, acquire a record number, create a virtual record, read a record, write a record, move a seek pointer, read data in items, write data in items, set and acquire a record type, change the time of accessing a record, and change a record mode are mentioned.

A function to initialize the VSDB system initializes the VSDB file. It performs initialization of wide area variables or pointers, initialization of a cache and the like, acquisition of a cache memory, and the like. A function to end the VSDB system closes the VSDB file if any is opened, and releases a cache memory.

A function to open and create a file opens the VSDB file. It delivers a file name and an error mode to parameters and returns a pointer to a VSDB management area. An open mode specifies whether a file is created in the event that no file exists, and specifies whether a file is forcedly opened in the event that the file is broken. These specifications may be performed collectively by combining them through an OR operation. This operation acquires a necessary memory and reads file management information such as a header, control, and the like. In the event that a header or control has an error and a forced opening is not specified, the system returns a NULL pointer and sets an error code at a wide area variable. It acquires necessary media information. A root record is opened by a record open instruction. In the event that a password has been set, actual access is prohibited until a password cancelling function is called.

The following states may cause an error to occur. An error occurs when there is no file or when the system is not in a file create mode. An error occurs also when a file is broken, namely, when the system is not in a forced execution mode, or when a file is broken so heavily that it may not be restored even if the system is in a forced execution mode. An error occurs when a file has a read-only attribute attached to it.

To close a file is a function of closing a VSDB file being opened, and closes every record contained in this file if any record is opened. It closes the root record, writes back a buffered cache, updates a control block, closes a file, and releases a memory space which has been used.

A function to temporarily close a file temporarily closes a VSDB file. It writes necessary information but does not release a memory. This process closes every record contained in this file, if any record is opened. It closes the root record, writes back a buffered cache, updates a control block, and closes the file.

A function to reopen a file reopens a temporarily closed file closed by the temporary close function. This process opens a file through a file path preserved in a file structure. It compares a file header or the content of control and, if they are different, it regards the file as a wrong file and returns an error. If the system is a system capable of obtaining information in a disk, the system inspects media on the basis of this information. An error means that the operation has attempted to reopen a different file having the same name or that the same file has been updated or broken.

A function to acquire the number of registered records acquires the number of registered records. It returns the number of records registered according to each mode.

A function to cancel and inspect a password makes it possible to access a file restricted from access. In the event that a wrong password is inputted, it returns an error and prohibits access. When it inspects existence of a password, it delivers a NULL pointer to a parameter. It compares an inputted password with the password of a control portion and, if they are the same, makes access possible.

A function to set a password sets a new password. When a password is updated, if the current password is wrong, the password is not set. It delivers a NULL pointer when there is not a password at present. The length of a password needs to be a character string of 15 or less bytes except a null terminate. It may not set a password and returns an error when the password is of 15 or more bytes. When a new password is a null pointer, the password is cancelled.

A function to delete a record deletes a record specified by its record number. It releases every packet held by the record. It brings a used state of the status byte of a record descriptor into an unused state. It notifies a bitmap holding the use state of a record that the status byte has come into an unused state. In the event that a record is made to refer to another record, namely, in the event that its link count is not less than one, the record may not be deleted but comes into a trashed state. When a trashed record is deleted, the number of released packets is subtracted from the number of trashed packets.

A function to trash a record trashes a record specified by its record number. It brings the state of the status byte of the record descriptor of the specified record from a used state into a trashed state. And it calculates the number of packets contained in this record and adds the result to the number of packets in a trashed state. The records being in the trashed state may not be opened.

An unused record or a discarded record may not be trashed.

A function to restore a record restores a trashed record. It brings the state of the status byte of the record descriptor of the specified record from a trashed state into a used state. And it calculates the number of packets contained in this record and subtracts the result from the number of packets in a trashed state. An unused record may not be restored.

A function to link a record creates a virtual record of a record specified by its record number. It finds an unused record and links this record with a record specified as a virtual record. In the event that a linking record is a virtual record, however, a virtual record created is linked with a real record of the linking record.

A function to open a record opens a record to be used. Since a record is a variable-length record, it declares this fact before using the record. It is possible to access data of a record through handling record information returned by this function. Its mode needs to be set together with a write enabled mode.

In the event of specifying a new record to a record number, a vacant new record is allocated. An access mode of a created record is always a read and write enabled mode. Its method examines its record number, whether the same record has already been opened. If the record has not been opened, the method secures two areas of a record management area and a record handler area, and links a pointer from the handler to the record management area. If the record has been opened, it secures only the record handler and links the pointer to the existing record management area.

A function to open a management record opens a management record. This record may be accessed in the same way as any other record. In the event of opening it in a write mode or delete mode, this function copies the contents of the current management record into a reserve management record.

A function to close a record closes a record. It performs the following process when closing a record. It writes the contents of a record held by a cache buffer into a file. It updates the contents of a record descriptor. It releases a handle of the record.

A function to acquire a record number obtains a record number from the record information handle being currently accessed. This is typically used when a new record is opened. In the event of executing a function onto a handle of a management record and the like, a record number returns a control.

A function to set and acquire the type of a record sets and acquires the type of an opened record. In the event of setting the type of a record, the function sets its type number as the type of a parameter.

A function to set and read a record access right sets and reads the access permission for a specified record. It examines, based on its record number, whether the relevant record has been opened. If the record has been opened, it changes a record descriptor on the record. The access restriction by this change comes into effect from the next opening, but has no effect on the current opening. If the relevant record has not been opened, the function reads the relevant record from the root record and changes its status byte.

A function to acquire and set the last access time sets and reads the last access time of a specified record.

A function to read a record reads data of a specified number of bytes from the record. The function returns the length of the read data to the system.

A function to write data in items writes item data into a specified record. A seek pointer of the record moves to the next location. In the event that an error such as a disk full error or the like occurs, the function stops writing, returns the seek pointer to the location before writing, and cuts the written portion.

A function to read data in items reads item data from a specified record. A seek pointer of the record moves to the next location. In the event that the length of an item is larger than the length of a buffer, the function returns the seek pointer to the current location and stops reading.

Figure 12:
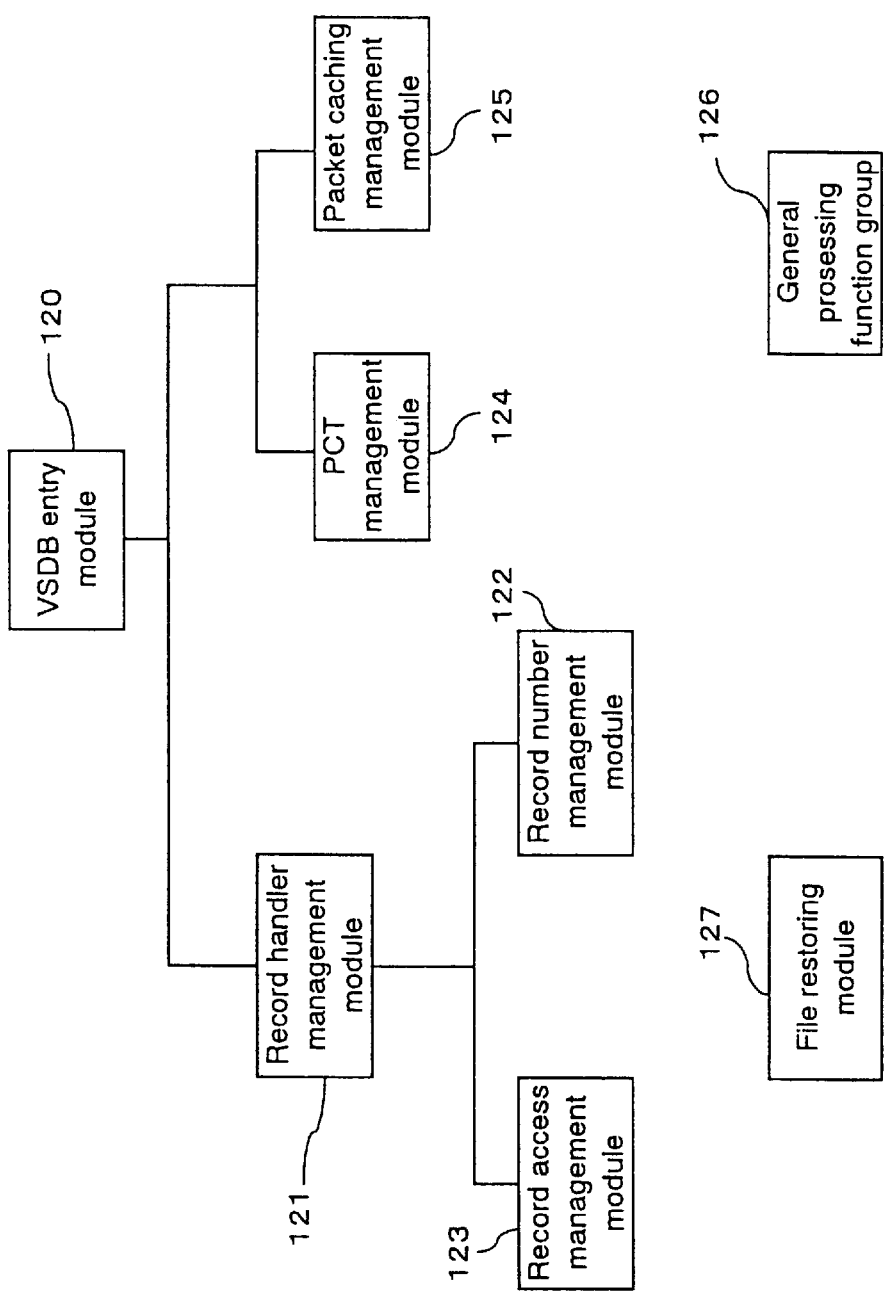
FIG. 12 shows an example of a VSDB module structure according to an embodiment of the present invention.

The functions of the present invention have been described above. Further, a file system of the present invention is comprised of seven modules. Each module is described with reference to FIG. 12.

A VSDB entry module 120 is a module composed of public functions of VSDB modules. When a VSDB operating function is called, the following five modules are called and a process is performed.

A record handler management module 121 performs a process for unifying managements to be performed by individual handlers since one record is accessed by plural handlers. This produces the record handling in duplicate or processes a virtual record.

A record number management module 122 typically performs management until it obtains an actual node descriptor with the root record from a record number. This module corresponds to the root record and corresponds to a VSDB file in a one-to-one correspondence.

A record access management module 123 performs a process such as acquirement of a cluster and a packet address of actual record data from a node descriptor.

A management module handled by this module typically corresponds to a node descriptor in a one-to-one correspondence.

A PCT management module 124 typically manages a vacant packet for each cluster. This module performs also a caching process on a PCT.

A packet caching management module 125 performs a caching process in packets in linkage with management of a packet. This process is performed in packets or in blocks, each block composed of eight consecutive packets.

An exception processing module is a module not included in the above modules. It includes a general processing function group 126 and a file restoring module 127.

Figure 13:
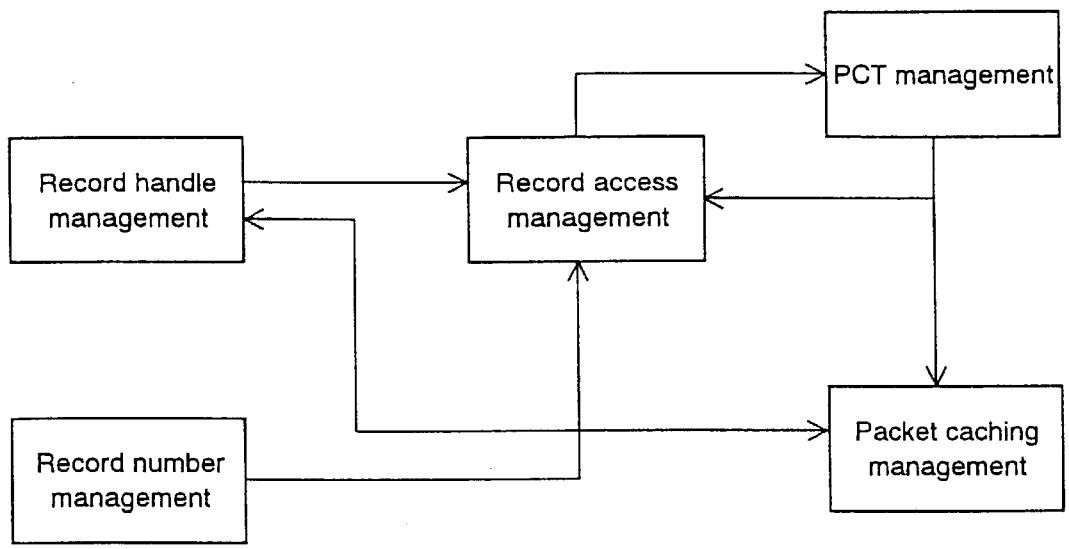
FIG. 13 shows a block diagram example of flow of data in a VSDB module according to an embodiment of the present invention.

Hereupon, FIG. 13 shows the flow of data managed and operated with respect to each module as data management. Next, operation of an actual database using a database apparatus according to the present invention is described.

First, a database is defined. A database determines what types of items exist, and the type and size of data to be contained in each of the items. As inputted data, the identifier, item name, size, and type of data are inputted. An item definition portion which has received these, reads the inputted data into a packet. If the packet is full, it reads the data into the next packet. Control of these is managed by a node descriptor and a node allocation table in a control packet being at the front position of packets described below. Items managed by a node descriptor include the status, data type, time of update, size, and packet address of data. A system performs definitions based on these inputted data and generates item data.

Next, the VSDB system notifies a record definition portion of the generated item data. The record definition portion which has received the item data generates record data in the form of a packet.

The generated packets are related and managed by the node descriptor and the node allocation table in the control packet at the front position of the packets.

Next, the VSDB system stores the inputted data in the database on the basis of the record generated by the record definition portion. The type, data length, and data are stored in the form of a packet. The generated packet records are related and managed by the node descriptor and the node allocation table in the control packet at the front position of the packets. The above-mentioned operations form a variable-length database managed by each module associated with the VSDB system.

A variable-length database system according to the present invention typically handles an item definition structure, a record structure, and a data record as variable-length data by managing the whole file as an aggregate of packets. Therefore, it becomes possible to handle huge multimedia data such as image data, voice data, movie data, characters, figures, and the like.

The present invention may provide a database apparatus and a database accessing method capable of flexibly coping with data structures becoming more and more diversified. Additionally, said database may automatically take in multimedia data utilizing the Internet.

Furthermore, the invention may not need to stop the system in order to normalize the structure of a database. The invention typically performs addition or change of data as keeping the system operated when the addition or change of data is needed. Therefore, it becomes possible to efficiently change the structure of a database or manage huge multimedia data. A variable-length database of the present invention is capable of coping with a new flexible data structure of XML or the like having a flexible data structure so as to adapt to a system capability required for a future information environment.

While a detailed description of exemplary embodiments have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A variable-length database apparatus provided with an inputting portion for inputting stored data and a retrieval condition, a database for storing data inputted by said inputting portion, a database management system for reading and writing data from and to said database, and an outputting portion for outputting the result of retrieving data stored in said database, comprising:

means for generating an item definition area for storing, and for relating to each other, an item name, a data type, and an item length of each item of data defined in the database, and a packet number given to the item;

means for generating a record management area for giving the packet number to a record comprising items defined by the item definition area, and for storing, and relating to each other, the packet number for each of such items in the record;

means for generating a data area by referring to other data inputted by the inputting portion and the record management area;

extracting means for extracting, when data inputted by the inputting portion and data in the record management area are matched with a retrieval condition in retrieval of data, the matched data from the data area;

an outputting means for outputting the data extracted by the extracting means;

means for forming each of the item definition area, the record management area and the data area out of independent packets managed by a node descriptor and a node allocation table;

means for indirectly addressing the packets by means of packet addresses managed by the node allocation table indicated by the node descriptor; and means for managing a process of indirectly addressing each record of up to $n^2/8$ bytes when one packet is of n bytes;

wherein the item definition area, the record management area, and the data area are formed out of variable-length data;

wherein the item definition area, the record management area and the data area are each a data table having a plurality of packets and clusters;

wherein the size of each packet may be optionally set; and wherein each record is divided and stored into plural packets when the data size of a record is larger than the size of said packet, the variable-length database apparatus further comprising means for indirectly referring to the packets in addressing the divided and stored data.

2. A variable-length database according to claim 1, further comprising:

means capable of managing a one or more stage indirect addressing process in the event that the size of a record is not smaller than the size of a packet.

3. A variable-length database apparatus provided with an inputting portion for inputting stored data and a retrieval condition, a database for storing data inputted by said inputting portion, a database management system for reading and writing data from and to said database, and an outputting portion for outputting the result of retrieving data stored in said database, comprising:

means for generating an item definition area for storing, and for relating to each other, an item name, a data type, and an item length of each item of data defined in the database, and a packet number given to the item;

means for generating a record management area for giving the packet number to a record comprising items defined by the item definition area, and for storing, and relating to each other, the packet number for each of such items in the record;

means for generating a data area by referring to other data inputted by the inputting portion and the record management area;

extracting means for extracting, when data inputted by the inputting portion and data in the record management area are matched with a retrieval condition in retrieval of data, the matched data from the data area;

an outputting means for outputting the data extracted by the extracting means; and means for forming each of the item definition area, the record management area and the data area out of independent packets managed by a node descriptor and a node allocation table;

wherein the item definition area, the record management area, and the data area are formed out of variable-length data;

wherein the item definition area, the record management area and the data area are each a data table having a plurality of packets and clusters; and wherein the number of packets contained in each cluster is 8n when the size of the packet is n bytes.

4. A variable-length database according to claim 3, wherein the said node allocation table manages the address of the packets and the node descriptor manages the basic information, location, and size of each record.

5. A variable-length database according to claim 3, wherein the variable length data has a length and type optionally set for each data.

6. A variable-length database according to claim 5, further comprising a means for accessing each data table in packets.

7. A variable-length database according to claim 5, wherein the first packet of the first cluster of each data table is a table control packet.

8. A variable-length database according to claim 7, wherein each cluster has a packet control table showing a use state of each packet.

9. A variable-length database according to claim 3, wherein the size of each cluster is 8n2 bytes when the size of the packet is n bytes.

10. A variable-length database according to claim 3, wherein the size of each packet may be optionally set.

11. A variable-length database according to claim 10, wherein
each record is divided and stored into plural packets when the data size of a record is larger than the size of said packet.

12. A variable-length database according to claim 11, further comprising:
means for indirectly referring to the packets in addressing the divided and stored data.

13. A variable-length database according to claim 12, further comprising:
means for indirectly addressing the packets by means of packet addresses managed by the node allocation table indicated by the node descriptor.

14. A variable-length database according to claim 10, wherein
the packets are independent and not restricted by the continuity or the location of each packet stored in said file.

15. A database apparatus for storing variable-length data items, comprising:
an inputting portion for receiving a data item to be written into said apparatus and for receiving a retrieval condition when a data item is to be read from said apparatus, an outputting portion for outputting data items read from said apparatus, a database management system for controlling the writing and reading of data items, and a data store;
wherein each data item is stored in the form of one or more data packets;
wherein the data store comprises:
an item definition area for storing in connection with each data item and in relation to each other, a data item name, a data item type, and a data item length and for storing the packet address assigned to each said data item;
a record management area for assigning a packet address to a record, the record comprising a plurality of data items related to each other and defined by said item definition area; and
a data area for storing data items;
wherein each of said item definition area, said record management area and said data area is formed with variable-length data;
wherein each of said item definition area, said record management area and said data area are accessed through a node descriptor associated with each data item, said node descriptor indicating the length of the data item and the beginning packet address of the data item; and
wherein said database management system retrieves a data item from said data store when a retrieval condition inputted at said inputting portion matches data in said item definition area and said record management area, and results in the retrieved data item being provided to said outputting portion.

16. The data base apparatus of claim 15, wherein each of said item definition area, said record management area and said data store area are further accessed through a node allocation table, said node allocation table comprising packet addressees accessed by data stored in said node descriptor.

17. A variable-length database accessing method for inputting stored data and a retrieval condition, storing inputted data, and outputting the result of retrieving data stored in said database, comprising:
generating an item definition area for storing, and relating to each other, an item name, a data type and an item length of each item of data defined in the database, and the packet number given to each item;
generating a record management area for giving the packet number to a record of items defined by the item definition and for relating to each other and storing them in it;
generating a data area by referring to other data inputted by the inputting portion and said record management area;
extracting, when data inputted by the inputting portion and data in the record management area are matched with said retrieval condition in retrieval of data, the matched data from the data area;
outputting the extracted data;
wherein each of the item definition area, the record management area and the data area are formed out of a data table having independent packets managed by a node descriptor and a node allocation table;
wherein the node allocation table manages the address of the packet and the node descriptor manages the basic information, location, and size of the record;
wherein the data table comprises a plurality of packets and clusters;
wherein the first packet of the first cluster of the data table is a table control packet;
wherein each cluster of the data table has a packet control table showing a use state of each packet;
wherein, in the event that the data size of any record is larger than the size of a packet, the record is divided and stored into plural packets, the variable-length database accessing method further comprising indirectly addressing a packet when addressing the divided and stored data;
wherein the indirect addressing step is performed by referring to the relevant packet by means of a packet address managed by the node allocation table specified by the node descriptor; and
wherein the step of indirectly addressing addresses a record of up to $n^2/8$ bytes when one packet is of n bytes.

18. A variable-length database accessing method according to claim 17, wherein the data has a length and type optionally set for each data.

19. A variable-length database accessing method according to claim 17, wherein the packet is a basic unit to be handled by the table.

20. A variable-length database accessing method according to claim 17, wherein there is one more stage indirect addressing in the event that the a size of a record is not smaller than the size of a packet.

21. A variable-length database accessing method according to claim 17, wherein the packets are independent and not restricted by the continuity or the location of each packet stored on the file.

22. A variable-length database accessing method according to claim 21, wherein the database may automatically determine and register the type of multimedia data utilizing the Internet at the database.

* * * * *